Figure 1:
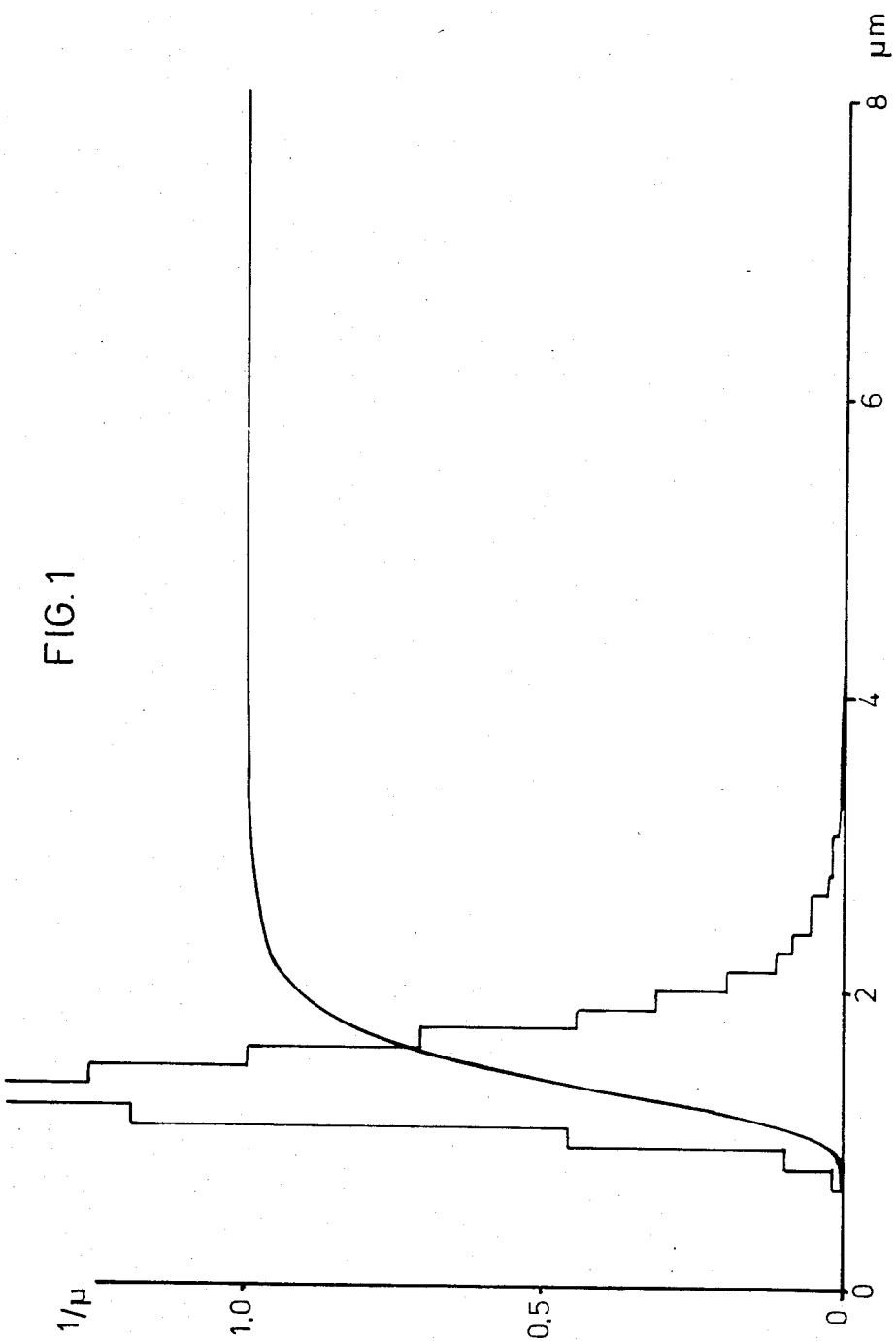

United States Patent [19]

Himmelmann et al.

[11] Patent Number: 4,524,131
[45] Date of Patent: Jun. 18, 1985

[54] PHOTOGRAPHIC SILVER HALIDE RECORDING MATERIAL WITH GRAFT COPOLYMER PARTICLES IN OUTER LAYER

[75] Inventors: Wolfgang Himmelmann; Günter Sackmann; Rudolf Meyer, all of Leverkusen, Fed. Rep. of Germany

[73] Assignee: Agfa-Gevaert Aktiengesellschaft, Leverkusen, Fed. Rep. of Germany

[21] Appl. No.: 643,159

[22] Filed: Aug. 22, 1984

[30] Foreign Application Priority Data

Sep. 1, 1983 [DE] Fed. Rep. of Germany ....... 3331542

[51] Int. Cl.³ .............................................. G03C 5/24
[52] U.S. Cl. ................................... 430/523; 430/539; 430/950
[58] Field of Search ............... 430/271, 523, 539, 950, 430/961

[56] References Cited

U.S. PATENT DOCUMENTS

| | | | |
|---|---|---|---|
| 4,142,894 | 3/1979 | Hori et al. | 430/950 |
| 4,264,719 | 4/1981 | Kameoka et al. | 430/950 |
| 4,287,299 | 9/1981 | Himmelmann et al. | 430/523 |
| 4,396,706 | 8/1983 | Ishii et al. | 430/950 |
| 4,399,213 | 8/1983 | Watanabe et al. | 430/539 |

Primary Examiner—Jack P. Brammer
Attorney, Agent, or Firm—Connolly and Hutz

[57] ABSTRACT

The recording material contains in an outer layer preformed polymer particles, the particle size of which is less than 10 μm and which have a particle size distribution of ±1 μm, which are soluble in alkaline medium and are dispersed in a hydrophilic colloid, and which are a graft copolymer of methacrylic acid and methylmethacrylate on the graft base of an α-olefin- or styrene-maleic acid semiamide-copolymer.

6 Claims, 6 Drawing Figures

PHOTOGRAPHIC SILVER HALIDE RECORDING MATERIAL WITH GRAFT COPOLYMER PARTICLES IN OUTER LAYER

This invention relates to a photographic silver halide recording material which contains, in an outer transparent layer which is applied to the front and/or rear side, polymer particles which have a particle size of less than 10 μm, are soluble in alkaline processing liquids and are dispersed in a hydrophilic colloid.

The hydrophilic colloids, such as gelatine, which are conventionally contained in the outer layers of photographic silver halide recording materials, produce an increased tackiness of the recording materials at a high level of atmospheric moisture and at a relatively elevated temperature so that recording materials of this type tend to stick together, for example when stacked for packaging. This tendency of the various parts of the recording material to adhere to each other or to other materials with which they come into contact gives rise to a whole series of problems in the camera, and during the production, processing, projection or storage of the recording material.

In order to overcome these difficulties, it is known to mat the outer layers of recording materials by incorporation of finely powdered inorganic compounds, such as silicon dioxide, magnesium oxide, titanium dioxide or calcium carbonate or of organic compounds, such as polymethyl methacrylate or cellulose acetate-propionate, thereby reducing the tackiness thereof. This "matting" suffers, however, from various disadvantages. By way of example, the outer layer cannot be homogeneously produced since the above-mentioned finely-powdered constituents tend to aggregate in the coating solution. Moreover, recording materials which have an outer layer containing finely-powdered material are more easily damaged and are more difficult to transport in a camera or in a projector since their surface is not sufficiently capable of sliding. Moreover, the presence of finely-powdered materials in the outer layer reduces the transparency of the recording material after processing and increases the graininess of the picture.

A photographic light-sensitive material is known from German Offenlegungsschrift No. 2,758,767, which has an outer light-insensitive gelatine layer which contains colloidal silica particles of from 7 to 120 nm in size and a polymeric latex, the particles of which are from 30 to 80 nm in size. This gelatine layer gives the photographic material an increased breaking and dimensional stability.

The disadvantage of a photographic material which is finished in this manner is, however, that the additives reduce the transparency of the layer and in particular at relatively high levels of moisture (e.g. more than 85% relative humidity) and at a relatively elevated temperature of from 35° to 40° C. adverse contact specks from a sensitometric point of view cannot be avoided when the materials are rolled up.

Various processes are known for the production of finely-grained materials which have a matting effect. Polymer particles having a particle diameter of from about 5 to 0.01 μm may be produced by emulsion polymerisation if the quantity of the emulsifier (the surface-active agent), the temperature of polymerisation and stirring conditions are controlled in a suitable manner. The method is described, by way of example, by H. Reinhard, "Dispersionen synthetischer Hochpolymerer", part II, page 3 et seq., Springer Verlag or by F. Hölscher in the corresponding part I, page 31 et seq. It is possible, in this manner, to produce only particles, the average size of which differs by at least 2 μm, and which thus have a relatively non-uniform particle size. Polymer particles which have a wide particle size distribution and which are not spherical but completely irregular in shape are obtained by mechanical pulverisation and subsequent classification according to particle size.

Spherical polymer particles may be produced by dissolving a polymer in a water-immiscible organic solvent and spraying the solution under elevated pressure from a fine nozzle into an aqueous medium. The particle size which is thereby obtained is nowhere near uniform and an apparatus which has a large volume is required. Hitherto, there was not a generally usable, profitable process for the production of polymer particles having a particle size ranging from 1 to 10 μm.

Finely-divided polymer particles may also be produced by dispersion. To this end, one or more polymers are dissolved in a solvent which is insoluble in water or substantially water-immiscible and has a lower boiling point than water or forms with water an azeotropic mixture which has a lower boiling point than water. The polymer solution is dispersed as a dispersing agent, in the form of drops, in an aqueous medium, the viscosity and surface tension being suitably adjusted, and the solvent is removed from the drops with the formation of fine polymer particles. These particles may be separated in the form of a powder by subsequent centrifugation and by drying (German Offenlegungsschrift No. 2,522,692).

A disadvantage of this process is, however, the fact that the particles have to be produced during the stirring operation and are thus not already pre-formed. The particle size depends on the concentration of the polymer solution, the ratio of the polymer solution to the aqueous medium, the type and quantity of the hydrophilic colloid, the temperature, the stirring speed and the pH value of the aqueous medium. The low-boiling solvent has, moreover, to be carefully distilled off so as not to destroy the particles.

Pre-formed, water-insoluble polymer particles which have a relatively narrow particle size distribution and are suitable as matting agents for photographic layers may be obtained by the suspending copolymerisation of maleic acid anhydride and 1-olefins (German Offenlegunsschriften Nos. 2,501,123, 2,919,822 and 3,144,793). The process produces particles which are sufficiently uniform as far as the particle size thereof is concerned, but which are, however, alkali-insoluble. For this reason, after the processing of the photographic material they remain on the surface and thus increase the graininess of the light-sensitive material.

There have been many attempts to find alkali-soluble polymer particles which can be removed from the surface during processing in alkaline processing liquids. Reference should be made to the publications U.S. Pat. No. 2,322,037, U.K. Pat. No. 878,520, U.S. Pat. Nos. 4,094,848 and 4,142,894, U.K. Pat. Nos. 2,012,978 and 1,055,713.

All particles which are obtained by dispersing an acid-insoluble and alkali-soluble mixed polymer in gelatin solutions suffer from the disadvantage of having a wide particle size distribution. This results in the fact that, even if the major proportion of the particles is, for example, 4 μm in size, a considerable proportion of smaller particles which have a matting effect and a considerable proportion of larger particles which cause difficulties when moistened have to be reckoned with. It is, moreover, extremely difficult to reproduce a particle size distribution which has been achieved once. Subsequent correction is then only possible by using filtering cascades.

An object of the present invention is to develop outer layers which attenuate the tackiness of a photographic material and which have good gloss and transparency after processing.

The present invention thus provides a photographic silver halide recording material which contains, in an outer transparent layer which is applied to the front and/or rear side, pre-formed polymer particles which have a particle size of less than 10 μm, are soluble in alkaline processing liquids and are dispersed in a hydrophilic colloid, characterised in that the layer contains, in a dispersed form, from 10 to 500 mg/m² of spherical particles of a graft copolymer of methacrylic acid and methyl-methacrylate on the graft base of an α-olefin-or styrene-maleic acid semi-amide-copolymer or the alkali metal salts of alternating copolymers of maleic acid anhydride and α-olefins or styrene having a particle size of from 0.5 to 8 μm and a particle size distribution of ±1 μm.

The graft copolymers which are used in the outer layer of the recording material according to the present invention are insoluble at a pH value below 7, but are soluble above pH 8. They consist of from 80 to 99% of methacrylic acid and methyl-methacrylate and of from 1 to 20% of an alternating copolymer consisting of maleic acid semi-amide and an α-olefin or styrene as a graft substrate. The particles of the graft copolymer are from 1 to 8 μm in size, preferably from 1.5 to 5 μm and the acid number of the polymer is from 200 to 300, preferably from 210 to 270.

The polymer particles which are insoluble at a pH value of 6 but are soluble in alkaline medium may be obtained by the radically initiated graft copolymerisation of mixtures of methacrylic acid and methyl-methacrylate in the presence of diluted aqueous/alcoholic solutions of the semi-amide/semi-ammonium salts or the alkali metal salts of alternating copolymers of maleic acid anhydride and α-olefins or styrene.

The preformed, polymeric, alkali-soluble polymer particles are produced in a finely-divided aqueous/alcoholic suspension as spherical particles in a relatively narrow particle size distribution. The particle size of the polymers ranges from 0.5 to 8 μm, but preferably from 1.5 to 5 μm.

As their insolubility in an acid medium and in the pH range of from 6 to 8 on the one hand and on the other hand their rapid, good solubility in the alkaline medium of photographic developing solutions (pH of greater than 8) are important prerequisites for their use, it is essential that these particles are structured in such a way, as far as their molecular weight and carboxyl group content is concerned, that the above-mentioned criteria are observed. For this reason graft copolymers which have a limit viscosity number [η] of from 0.3 to 1.2 (dl/g), preferably from 0.3 to 0.8 (dl/g), measured in 1% aqueous Na₂CO₃ solution, and an acid number of from 200 to 300, or a methacrylic acid content of from about 30 to 46% by weight are most suitable. If the acid number of the polymer particles is, for example, below 200, then they are either completely insoluble or dissolve too slowly in a photographic developing solution.

If the acid number is above 300, then there is a risk that the polymer particles already dissolve in the aqueous gelatine dispersions and are then no longer capable of having the desired effect. The acid number preferably ranges from 210 to 270. Even if the acid number of the polymer particles is within the preferred range, this is not the only prerequisite for rapid dissolving during the photographic developing process. It is, moreover, necessary that the molecular weight is not too high but is rather in a preferred limit viscosity number range of from 0.3 to 0.8 (dl/g), measured in 1% aqueous Na₂CO₃ solution.

The desired molecular weight range may be adjusted by the addition of from 0.1 to 2.0%, by weight, based on the monomers which are used, of polymerisation regulators of the enol ether type to the polymerisation mixture. Substances which correspond to the following general formula may be used as preferred regulators;

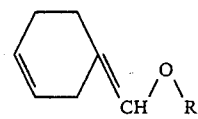

wherein R represents $C_{1-20}$ alkyl, $C_{5-10}$ cycloalkyl, such as cyclohexyl, or $C_{7-20}$ aralkyl, such as benzyl.

Unlike the sulfur-containing compounds which are conventionally used to regulate the molecular weight of polymers, the regulators of the enol ether type have the advantage that they are virtually odourless and do not have an adverse effect on photographic layers.

If the limit viscosity number of the polymers is too high, the particles dissolve so slowly in the alkaline medium that this stage is not completed in the limited period of time of the photographic developing process.

The polymer particles are produced in aqueous/alcoholic phase, the phase ratio of water to alcohol ranging from 90:70 to 10:30 parts by weight, by a radically initiated graft copolymerisation of a mixture consisting of methacrylic acid and methyl-methacrylate on the water-soluble salt of an alternating copolymer consisting of maleic acid anhydride or maleic acid semi-amide and an α-olefin or styrene. Primarily ethylene, propylene, isobutylene or diisobutylene may be used as α-olefins. The molecular weight of these alternating copolymers ranges from 15,000 to 500,000 and they are converted into water-soluble polyelectrolytes by reaction with alkali metal hydroxides or the aqueous solutions of ammonia or aliphatic mono- or diamines, such as methylamine, ethylamine, ethanolamine, dimethylamine, diethylamine or diethanolamine. Unlike the reaction with the alkali metal hydroxides, the reaction with the amines does not produce di-salts but, in each case, the semi-amide/semi-ammonium salts are produced.

The quantity of water-soluble polymeric graft substrate is from 1 to 20% by weight and preferably ranges from 2 to 6% by weight, based on the comonomer pair to be polymerised. This copolymerisation process produces polymeric particles as aqueous/alcoholic suspensions which have a polymeric particle content of from 10 to 30% by weight, based on the suspension.

The suspensions which are obtained in this manner may also contain a certain proportion of linear copolymers, in addition to graft copolymers. Cross-linked products are not produced at all and the particles are completely free of microgel.

This may be demonstrated by dissolving the particles in 1% aqueous $Na_2CO_3$ solution and determining the microgel content in the solution by means of an ultra-centrifuge. The particle size or the particle size distribution of the polymer particles may be influenced to a certain extent by the weight proportion of the polymeric graft substrate.

As the quantity of substrate increase, the particle size decreases and the particle size distribution becomes narrower. This shows that the dissolved polyelectrolytes act as dispersers as well as acting as graft substrate, and these dispersers prevent an agglomeration of the discrete polymer particles. The particle size ranges from 0.5 to 8 μm, a particle size ranging from 1.5 to 5 μm being preferred for the desired purpose of use.

The protective colloid effect of the graft substrate can also be seen if the particles are dispersed in the aqueous solution of a colloid, such as gelatine. If dispersions of this type are observed with a microscope, individual particles can be detected but no assemblages of particles.

The composition of the methacrylic acid/methyl meth-acrylate copolymers in particular, along with the molecular weight, is responsible for the easy solubility of the particles in alkaline medium.

As the methyl meth-acrylate content increases, the solubility thereof in aqueous/alkaline medium decreases, while the solubility increases as the methacrylic acid content increases. Products which have an acid number of from 200 to 300, preferably from 210 to 270, corresponding to a methacrylic acid content of from about 32 to 41.5% by weight, are suitable for the intended use in photographic layers.

Copolymers may also be produced using the above-mentioned copolymerisation process, the acid number of which is outside the above-mentioned range.

PRODUCTION EXAMPLE

The following reaction mixture is introduced into a 15 l stirrer vessel, which serves as a receiver, with constant stirring:

4,500 g of electrolyte-free water
450 g of a 10%, by weight, aqueous solution of the semi-amide/semi-ammonium salt of an alternating copolymer of styrene and maleic acid anhydride with a limit viscosity number $[\eta]=0.574$ (dl/g) (measured in dimethylformamide).
1,500 g of ethanol
15 g of regulator corresponding to the general formula

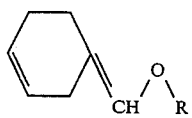

wherein R represents benzyl,
15 g of potassium persulfate, dissolved in
450 g of electrolyte-free water
600 g of methacrylic acid and
900 g of methyl methacrylate.

2250 g of this mixture are firstly introduced into a 12 l steel autoclave which is proviced with a blade stirrer. The autoclave is then sealed, subjected to a low $N_2$-excess pressure and heated to a temperature of 65° C. After a reaction time of 30 minutes at 65° C., the remainder of the reaction mixture from the receiver vessel is metered into the autoclave over a period of 2 hours by means of reciprocating pump. On completion of the pumping operation, the mixture is stirred for a further 4 hours at 65° C. and for a further 3 hours at 75° C. at a speed of 100 r.p.m.

The resulting finely-divided suspension is subsequently cooled to room temperature and left to stand.

Acid number of the copolymer:
260, corresponding to a methacrylic acid content of 39.8%, by weight.

Limit viscosity number: $[\eta]=0.456$ (dl/g), measured in 1% aqueous $Na_2CO_3$ solution.

Microgel content: 0%

Particle size: 1–3 μm

To determine the particle size, the graft copolymer suspensions are stirred into a water-glycerine mixture (1:1) and are counted and measured using a light microscope with a phase contrast device at a magnification of 1,000.

The dispersions which are obtained in the above-mentioned manner, may be distributed in aqueous solutions of hydrophilic colloids using any wetting agents. The following compounds may be used as hydrophilic colloids: proteins, such as gelatine, gelatine derivatives such as acetylated gelatine, phthaloyl gelatine or succinyl gelatine, albumin, casein, gum arabic, agar-agar, alginic acid, cellulose derivatives such as alkyl esters of carboxymethyl cellulose, preferably the methyl or ethyl esters, hydroxyethyl cellulose, carboxymethyl cellulose, synthetic polymers such as polyvinyl alcohol, polyvinyl pyrrolidone, polyacrylamide, salts of polyacrylic acid, salts of polymethacrylic acid, salts of polymaleic acid, salts of polystyrene sulfonic acid, preferably the sodium or potassium salts, and mixed polymers which contain at least one of the monomers of the above-mentioned polymers. Of the said hydrophilic colloids, amphoteric, polymeric electrolytes, such as gelatine, gelatine derivatives, casein and other protein compounds have a particularly pronounced effect. The hydrophilic colloids may be used individually or in the form of a combination. Preferred colloids include gelatine, gelatine derivatives, casein and other protein compounds. The colloid is effectively used in a quantity of from about 1 to 15%, by weight, preferably in a quantity of from 5 to 10% by weight, in each case based on the weight of the dispersion.

A further 0.1 to 1%, by weight of surface-active agents, based on the weight of the water which is present, may be added to the aqueous solutions which contain the dispersion. Examples of suitable surface-active agents are saponin and other compounds of a natural origin, non-ionic surface-active agents such as polyalkylene oxides, glycerine compounds such as monoglycerides or glycidol compounds, anionic surface-active agents having one or more acid groups, such as one or more carboxylic acid, sulphonic acid, phosphoric acid, sulphonic acid ester or phosphoric acid ester groups.

Surface-active agents which are particularly suitable are described in the U.S. Pat. No. 2,271,623; 2,240,472; 2,288,226; 2,676,122; 2,676,924; 2,676,975; 2,691,566; 2,721,860; 2,730,498; 2,742,379; 2,739,891; 3,068,101; 3,158,484; 3,201,253; 3,210,191; 3,294,540; 3,415,649; 3,441,413, 3,442,654; 3,475,174 and 3,545,974, in German Offenlegungsschrift 1,942,665 and in the U.K. Pat. Nos. 1,977,317 and 1,198,450 and in "Kaimen Kassei Zai no Gosei to Sono Ohyo" (Synthesis and Application of Surface Active Agent) by Ryohei Oda et al (Published by Maki Publishing Co, 1964), "Surface Active Agents" by J. W. Perry and A. M. Schwartz (published by Interscience Publications Inc., 1958), "Encyclopedia of Surface Active Agents", vol. 2, by J. P. Sisley (published by Chemical Publishing Co., 1964) "Kaimen Kassei Zai Binran (Surfactants Encyclopedia)", 6. Edition (published by Sangyo Tosho Co., 20. Dec. 1966) among others. Fluorine-containing wetting agents as are described in German Offenlegungsschrift 1,961,638 may also be used.

These surface-active agents may be used on their own or in form of combinations and compounds which are particularly suitable are compounds having one $OSO_3$M-group, such as sulfonate esters of conventional alcohols corresponding to the general formula $R-O-SO_3M$ or $R-(OCH_2CH_2)_n-OSO_3M$ (in which R represents an alkyl group having from 8 to 30 carbon atoms, M represents an alkali metal- or ammonium ion and n represents a positive integer of up to 20) and alkyl benzene sulfonic acid compounds corresponding to the general formula

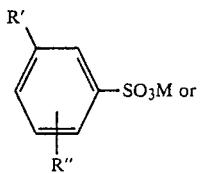

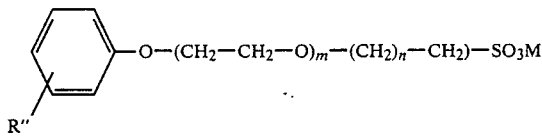

wherein

R' represents hydrogen or an alkyl group having from 1 to 18 carbon atoms,

R" represents an alkyl group having from 1 to 18 carbon atoms,

M represents an alkali metal- or ammonium ion, m represents a positive integer of from 0 to 20 and n represents the integer 3 or 4.

The resulting dispersions of the graft copolymers having a particle size of from 1 to 8 μm, preferably from 1.5 to 5 μm, are produced, in each case, up to from 70 to 80% in the same size or as particles having the same grain diameter. Only from 20 to 30% of the particles have a larger or smaller particle diameter.

The dispersions may either be directly added to the photographic casting solutions for the outer layer or the particles may be isolated in the form of pastes as solid residue by centrifugation. In this way so called "instant-matting agents" are obtained, that is matting agents which may be stirred into any photographic casting composition without a dispersing auxiliary. The polymers are photograhically inert and do not change the graininess of the recording material if they are used in the suitable quantity of from 10 to 500 mg/m².

The advantageous surface roughening which is achieved with the polymer particles according to the present invention may be further improved if colloidal silica in the form of a hydrosol is added to the casting composition containing the polymer particles before they are applied to the surface of the photographic material. Good results are obtained with conventional hydrosols having a particle size of from 50 to 150 nm, which are added to the casting composition in a quantity of from 0.5 to 2 parts, by weight, bassed on 1 part, by weight of the hydrophilic colloid. The silica particles which are introduced with the hydrosol are distinguishable from the polymer particles according to the present invention in dimension and for this reason they play no part in their specific effect. The contribution of the silica particles to the total effect is merely that they suppress the slight tendency of the surface layers which are produced according to the present process to form glossy points or colour specks.

The casting compositions which are used to produce the outer layers according to the present invention may contain further additives, if required, additives which have no effect on the desired nature of the surface. The following are exmples thereof: very finely-grained (100<0.1 μm) latices of rigid polymers such as polystyrene or polymethyl methacrylate. Further examples are very finely-grained (particle diameter <0.1 μm) latices of flexible homo- and copolymers such as polyethylacrylate, polyacrylic acid butylester-ethylacrylate or latices of polyether or polyester polyurethanes, as are described in "Research Disclosure", December 1978, Industrial Opportunities Limited., Hampshire, UK, Page 27 (XII A), also conductivity-increasing compounds as are described in "Research Disclosure", December 1978, Page 27 (XIII A), and finally hardeners as are described in "Research Disclosure", December 1978, Page 26 in (X) and perfusion auxiliaries as are described in (XI), also further lubrication-increasing agents such as silicone oil dispersions and substances which increase the viscosity of the casting solution.

The outer layers according to the present invention may be used to admit the hardener to the gelatine layers of the photographic material. In this known hardening process by coating with a hardener, the hardener reaches the deeper layers by diffusion. Thus, it is possible to harden, for example, a colour photographic multi-layered material in one step. Above all the so-called quick-acting hardeners are conventionally used for this operation. The following are examples of hardeners of this type: N-carbamoyl- and N-carbamoyloxypyridinium compounds. (U.S. Pat. Nos. 3,880,665 and 4,055,427), sulfo groups containing N-carbamoylpyridinium compounds representing free betaines or their metal salts (U.S. Pat. No. 4,063,952), 2-alkoxy-N-carboxydihydroquinoline esters (U.S. Pat. No. 4,013,468), isoxazolium salts (U.S. Pat. No. 3,321,313) or carbodiimides (German Pat. No. 1,148,446 and German Offenlegungsschrift No. 2,439,553).

The polymers which are used according to the present invention may be advantageously used in the protective or surface layers of photographic black-and-white materials, colour materials and in so-called noncurling layers of roll films, miniature films or sheet films.

The following Examples serve to illustrate the present invention in more detail.

GRAFT COPOLYMER 1 as a dispersion of 50 parts of graft copolymer in 100 parts of a mixture of 75:25%, by weight, of water/ethanol.

[η]=0.358 (dl/g), measured in 1% aqueous $Na_2CO_3$ solution.

Methacrylic acid proportion: 32.8%, methyl methacrylate proportion: 64.7%, 2.5% of copolymer styrene/maleic acid semi-amide, insoluble at pH<8.
The particle size distribution is shown in FIG. 1.

GRAFT COPOLYMER 2

$[\eta]=0.392$ (dl/g), measured in 1% aqueous $Na_2CO_3$ solution.

Figure 2:
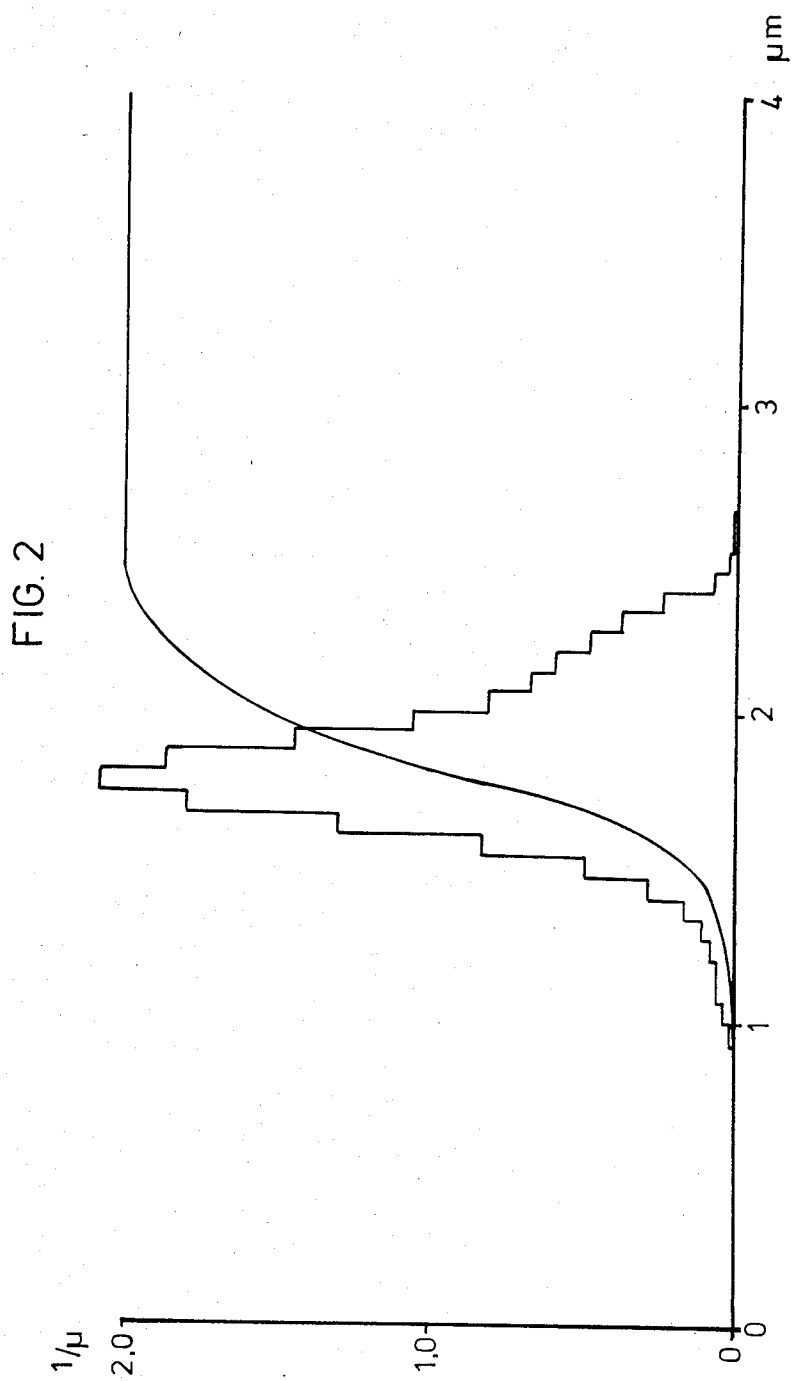

Methacrylic acid proportion: 33%, methyl methacrylate proportion: 64.5%,
2.5% of copolymer
styrene-maleic acid semi-amide, insoluble at pH<8.
The particle size distribution is shown in FIG. 2.

GRAFT COPOLYMER 3

$[\eta]=0.456$ (dl/g), measured in 1% aqueous $Na_2CO_3$ solution.

Figure 3:
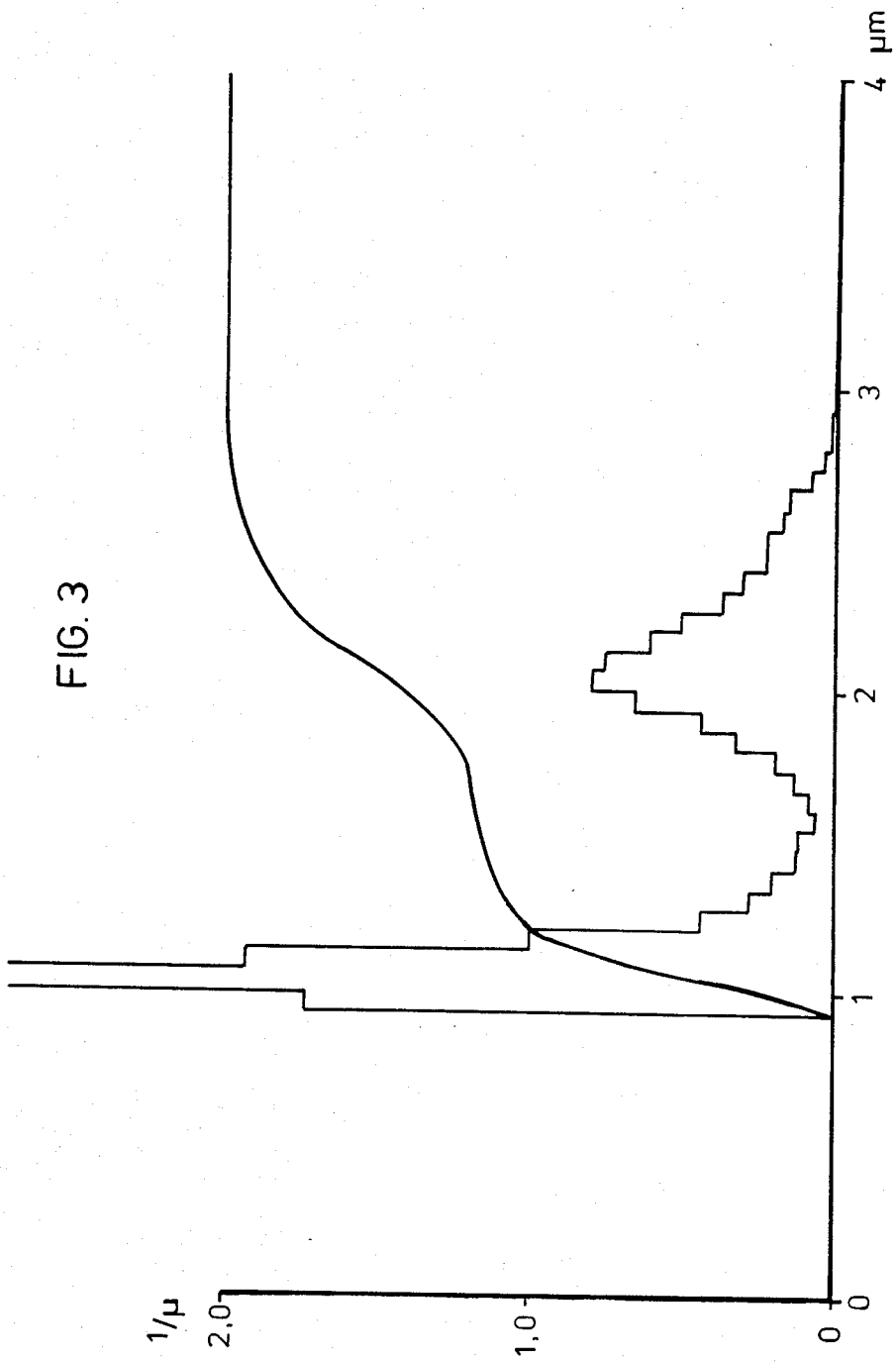

Methyacrylic acid proportion: 39.9%, methyl methacrylate proportion: 57.7%;
2.5% of copolymer
styrene-maleic acid semi-amide, insoluble at pH<8.
The particle size distribution is shown in FIG. 3.

GRAFT COPOLYMER 4

$[\eta]=0.345$ (dl/g), measured in 1% aqueous $Na_2CO_3$ solution.

Figure 4:
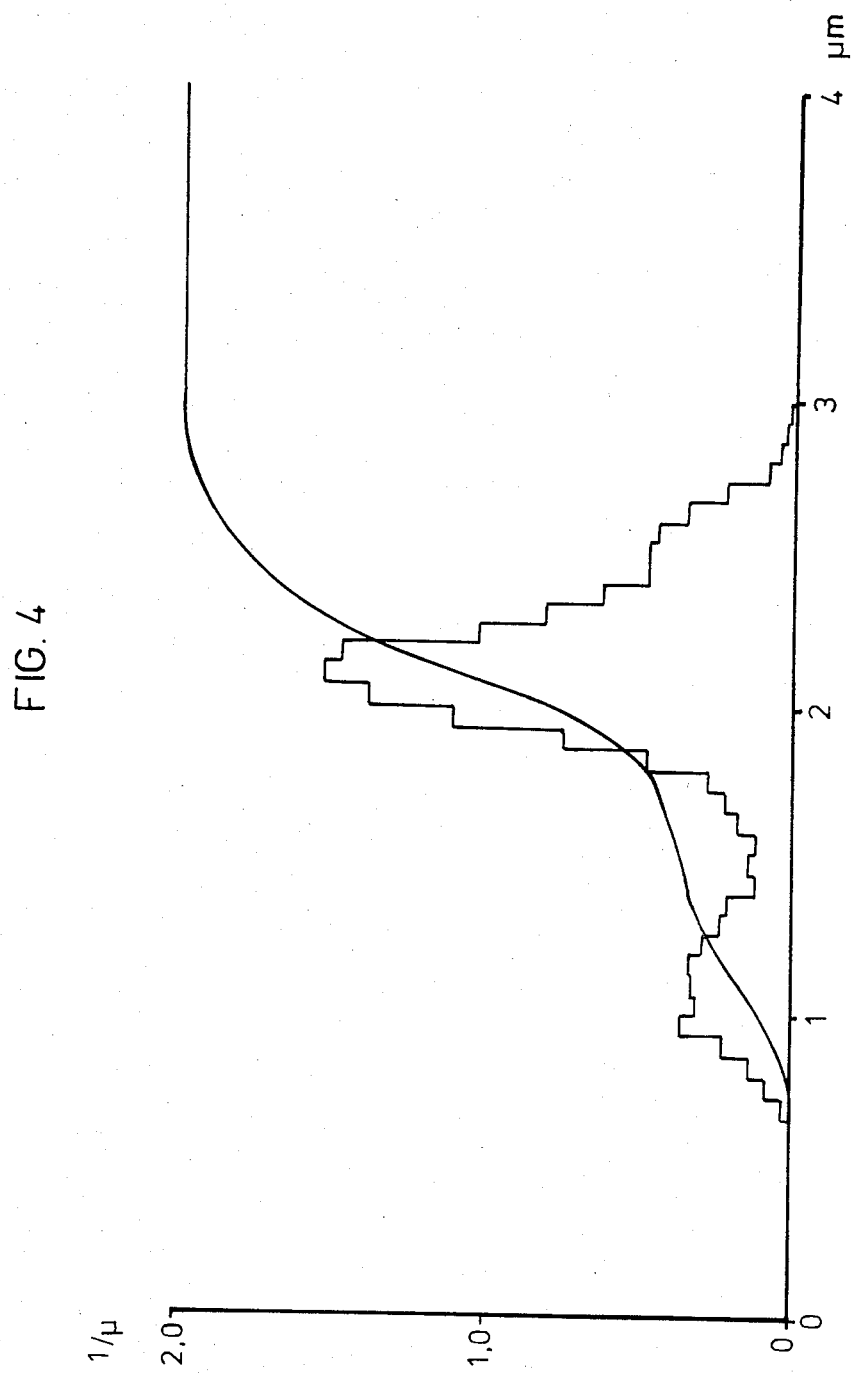

Methacrylic acid proportion: 36.2%, methyl methacrylate proportion: 61.3%;
2.5% of copolymer
styrene maleic acid semi-amide, insoluble at pH<8.
The particle size distribution is shown in FIG. 4.

In FIGS. 1 to 4, the frequency distribution of the particle diameters of the above-mentioned graft copolymers is shown as the frequency density $(1/\mu)$ corresponding to the individual particle diameters $(\mu m)$. Each of the Figures also contains its appropriate sum frequency curve (integral distribution).

Graft copolymers 3 and 4 are, in each case, mixtures of two dispersions having a narrow particle size distribution (bimodal distribution).

EXAMPLE 1

The following casting compositions are prepared to produce a surface protective layer (in the following the percentages mean %, by weight, unless otherwise specified):

400 g of gelatine solution 15%
2,800 g of water (desalinated)
80 g of wetting agent corresponding to the formula $$C_8F_{17}SO_3^{\ominus}[N(C_2H_5)_4]^{\oplus}$$

4% in water

In each case 4 g of the below-mentioned graft polymer (termed in short polymer) are stirred into this composition.

Shortly before the casting composition is applied, 2,000 g of a 10%, by weight, aqueous solution of the hardener corresponding to the formula

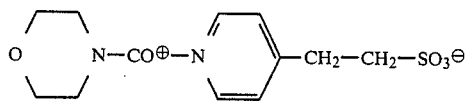

are added.

Wet application of the casting compositions: 50 g/m²; pH 6.5-7.0.

In accordance with the above-mentioned formulation, the following casting compositions are produced:

| A | Comparative sample, without polymer |
| B | Casting solution containing polymer 1 |
| C | Casting solution containing polymer 2 |
| D | Casting solution containing polymer 3 |
| E | Casting solution containing polymer 4 |

Moreover, casting compositions are produced as comparative samples which contain instead of a polymer of this invention, the following known matting agents which are not encompassed by the present invention:

| | | |
|---|---|---|
| F | poly-methyl methacrylate-particles (corresponding to U.S. Pat. No. 2,322,037) | ⌀ 3–8 μm |
| G | polytetrafluoroethylene particles | ⌀ 2–6 μm |
| H | calcium carbonate | ⌀ 1–5 μm |
| I | acetyl cellulose | ⌀ 3–8 μm |

The casting compositions are applied as the uppermost covering layer to an unhardened color negative film using a casting machine (wet application 50 g of the composition per m²) and the layer is dried at 25° C. and 60% relative atmospheric humidity. The covering layers form a dry layer of from 0.6 to 0.7 g/m².

The color negative film which is used has a conventional structure. A red-sensitized silver halide layer having an emulsified cyan color coupler, an intermediate layer, a green-sensitized silver halide layer having a magenta coupler, a yellow filter layer and a blue-sensitised yellow-coupler containing silver halide are successively applied to a cellulose triacetate base.

The intermediate layers consist of gelatine and a casting auxiliary, and the yellow filter layer additionally contains yellow colloidal silver. The layer thickness of the silver halide-containing layers is from 5 to 6 μm, and the thickness of the intermediate layer is from 1 to 2 μm. The film is cast without a hardener and is hardened by coating with the uppermost covering layer composition.

The color couplers and the casting auxiliaries are compiled in the following Table.

| Constituent | Red-sensitive | Green-sensitive EMULSION LAYER | Blue-sensitive |
|---|---|---|---|
| Colour coupler | 4-chloro-N—n dodecyl-1-hydroxy-naphthamide (0.88 g/m²) | 1,2,4,6-trichloro-phenyl-3-[3-(u-2,4-di-t-amyl-phenoxy) acetamido] benzamido-5-pyrazolone (0.75 g/m²) | 3-(2,4-diamyl phenoxy-acetamido)-o-(4-methoxy-benzoyl)-acetanilide (1.31 g/m²) |
| Coating auxiliary | sodium salt of dodecyl benzene-sulphonic acid (42 mg/m²) sodium salt of nonylphenoxy-polyethylene-oxypropane sulphonic acid (53 mg/m²) | sodium salt of dodecyl benzene-sulphonic acid (51 mg/m²) sodium salt of nonylphenoxy-polyethyleneoxy-propane sulphonic acid (64 mg/m²) | sodium salt of dodecyl benzene-sulphonic acid (67 mg/m²) sodium salt of nonylphenoxy-polyethyleneoxy-propane sulphonic acid (84 mg/m²) |
| Layer thickness | 5 μm | 6 μm | 5 μm |

After drying the samples A to I are tested in the following manner.

Test 1: Glossy Points

The samples are cut into sections 5 cm² in size and are conditioned for 2 days at 30° C. and 90% atmospheric humidity. The samples are then in each case stored for 1 day under pressure with the layer side against the rear side. Then the samples are ripped apart and the size of the surface which has adhered is contaminated (bright points on the surface).

Test 2: Cartridge removal

A film having a width of 35 mm and a length of 125 cm is wound into a film cartridge and stored for 7 days at 90% relative humidity and at 35° C. The extraction force (g) as the film is drawn out of the cartridge is subsequently determined and registered. In the following Table the maximum value is given in each case. In practice the extraction force should not be greater than 300 g.

Test 3: Yellow spot test

The film which has been stored according to Test 2 is photographically developed and examined for visible errors produced by storage, pressure and humidity. The number and size of the various large color spots is calculated in %, based on the surface which is tested. A film which has a suitable protective layer should have less than 5% of yellow spots.

Test 4: Graininess

The graininess of a photographic picture is caused by the developed colour grain and dispersions and matting agents in particular in the uppermost layers. The graininess is calculated by determining the $\sigma$-D-value with a 29 $\mu$m aperture as is described by J. H. Altmann in Appl. Optics, Volume 3, (1964) pages 35–38. A graininess of 1.8 is a value which is desired in photography.

Test 5: Surface gloss

The reflection (in %) of a light beam on the surface of the layer is determined. A gelatine layer which does not contain any dispersed particles has a reflection of 100%.

| Sample | Test 1 (glossy points) in % | Test 2 (cartridge removal) in g | Test 3 (colour spots) in % | Test 4 (Graininess) δ-D-value | Test 5 (Gloss before/after processing) |
|---|---|---|---|---|---|
| A | 80–90 | 1000–1500 | 20–50 | 1.8 | 94/95 |
| Present invention: | | | | | |
| B | <10 | 200–250 | 0–5 | 1.8 | 80/94 |
| C | <10 | 200–250 | 0–5 | 1.7 | 88/93 |
| D | <10 | 150–250 | 0–5 | 1.8 | 85/92 |
| E | <10 | 200–250 | 0–5 | 1.9 | 88/93 |
| Comparison: | | | | | |
| F | <10 | 200–250 | 0–8 | 2.2 | 85/87 |
| G | <10 | 200–250 | 0–8 | 2.0 | 80/88 |
| H | 20–30 | 600–800 | 10–20 | 2.1 | 80/87 |
| I | <10 | 150–250 | 0–5 | 2.3 | 80/83 |

The results which are compiled in the foregoing Table show all the advantageous properties of the polymer particles according to the present invention. Some of the comparative samples produce results in individual tests which are comparable to those of samples according to the present invention but only the samples according to the present invention produce consistently favourable results throughout all tests, including, and this is of importance, the graininess test. The surface gloss of the layers which contain the alkali-soluble polymer particles according to the present invention is very high after processing and the graininess is correspondingly poor, and quite obviously this cannot simply be explained by the fact that the polymer particles are removed during the course of the alkaline processing.

The proportion of larger particles in dispersions which have a wide size distribution spectrum can be very clearly seen in Test 4. All comparative dispersions which have insoluble particles and a conventional size distribution spectrum (about ±5 $\mu$m) have a high graininess in this test. This is particularly disturbing in photographic practice and in particular in medium-sensitive color films.

EXAMPLE 2

Various colloids are used to sheath the graft copolymer particles. In each case 1,900 ccm of water are introduced into 3 l beakers and 100 g of (a) acid-limed gelatine (isoelectric point: 9)

(b) acetyl gelatine (obtained by reaction with 10%, by weight, of acetic anhydride)

(c) polyvinyl pyrrolidone (mol weight 50,000)

(d) cellulose sulfate are dissolved therein.

Each of the samples is mixed with 4 g of one of the graft copolymers 1 to 4. Then the mixtures are digested for half an hour with stirring. The samples are subsequently poured through a gauze filter and centrifuged. A stock paste is obtained which contains from 50 to 60% by weight of graft copolymer particles.

As is described in Example 1, the pastes are added to individual covering layer casting compositions and the casting compositions are applied to the layer side of a color negative film. The covering layer casting compositions have the following composition:

400 g of aqueous gelatine solution 15%, by weight 2,600 g of water (desalinated)

70 g of 4%, by weight, solution of the wetting agent $C_7F_{15}COO^{\ominus}(NH_4)^{\oplus}$ 4 g of one of the sheathed graft copolymers 1 to 4

1,000 g of a 10%, by weight, aqueous solution of a reaction product of taurine with the compound $C(CH_2-SO_2-CH=CH_2)_4$ (1:1 molar) as a cross-linking agent.

In every case covering layers are obtained in which the particles are present in an aggregate-free form. The results are determined by microscopically comparing the samples.

The samples are tested for the effectiveness of the covering layers according to the four methods given in Example 1.

Sample A contains graft copolymer 1, sheathed with acid-limed gelatine;

B contains graft copolymer 2, sheathed with acetyl gelatine

C contains graft copolymer 3, sheathed with polyvinyl pyrrolidone

D contains graft copolymer 4, sheathed with cellulose sulfate.

A layer structure which has a covering layer without graft copolymer serves as a comparative sample E. The dry covering layers are from 0.6 to 0.7 $\mu$m thick (about from 0.6 to 0.7 g/m² application).

| Sample | Test 1 (glossy points) in % | Test 2 Cartridge removal in g | Test 3 (Colour spots) in % | Test 4 (Graininess) δ-D-value |
|---|---|---|---|---|
| A | 10 | 200–250 | 0–3 | 1.9 |
| B | 8–10 | " | " | 1.9 |
| C | 15 | " | " | 1.8 |
| D | 10 | " | " | 1.8 |

| Sample | Test 1 (glossy points) in % | Test 2 Cartridge removal in g | Test 3 (Colour spots) in % | Test 4 (Graininess) δ-D-value |
|---|---|---|---|---|
| E | 80–90 | 1000–1500 | 20–50 | 1.8 |

The extraction force (Test 2) of sample E, which does not contain any graft copolymer, is extremely high (high tackiness). In practice, the value of 300 g may not be exceeded. The sample cannot then be used.

The results show that the alkali-soluble graft copolymer particles according to the present invention are exceptionally effective even independently of the sheathing colloid. The particles prevent an emulsion side coming into contact with the rear side of a wound photographic film material, as they partly project over the surface of the covering layer. A comparison of the quantity of particles which are present in the protected layer per surface unit of the photographic material before and after the colour processing, shows that the particles are dissolved up to 80% in the alkaline developer.

EXAMPLE 3

The effect of the graft copolymers according to the present invention may be increased by addition of colloidal silica in the form of SiO$_2$-hydrosols or by addition of a latex of a rigid polymer or copolymer having a glass transition temperature of above 40° C. and a particle size of below 0.5 μm, such as polymethyl methacrylate, to the composition of the protective layer. Polystyrene sulfonic acid sodium salt or a copolymer corresponding to the structure

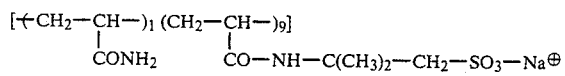

is added as a viscosity-increasing agent.

The following covering layer compositions are produced:

| | A | B | C |
|---|---|---|---|
| Gelatine solution (15% in water) | 400 g | 200 g | 400 g |
| Water (desalinated) | 2,800 g | 2,800 g | 2,800 g |
| Polystyrene sulfonic acid sodium (10% in water) | 60 g | 30 g | 30 g |
| Graft copolymer 1 | 4 g | 4 g | 4 g |
| Silica sol, 30% in water, particle size 14 nm | — | 100 g | — |
| Polymethyl methacrylate (in latex form) 20% in water | — | — | 50 g |
| Wetting agent of Example 1 %, by weight, in water | 80 g | 80 g | 80 g |
| Hardener (10% in water) according to the following formula | 2,000 g | 2,000 g | 2,000 g |

The pH of the solutions is from 6.5 to 7; the wet application is 50 g/m$^2$.

The hardener corresponds to the formula

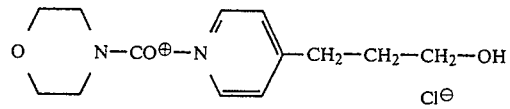

The covering layer solution is poured onto an unhardened colour negative film and dried.

The test is subsequently carried out as in Example 1.

| Covering layer | Test 1 (Glossy points) in % | Test 2 (Cartridge removal) in g | Test 3 (Colour spots) in % | Test 4 (Graininess) δ-D-value |
|---|---|---|---|---|
| A | 5–10 | 150–250 | 0–3 | 1.8 |
| B | 0–5 | 150–200 | 0 | 1.8 |
| C | 0–5 | 150–200 | 0 | 1.9 |

Glossy points and colour spots may be almost completely avoided by combining the graft copolymers according to the present invention with silica sol or latex as shown by Examples B and C.

EXAMPLE 4

Comparative dispersion (A):

As a comparison, a dispersion of a porous alkali-soluble substance (corresponding to U.S. Pat. No. 4,094,848) is produced in an aqueous gelatine solution: 20 g of gelatine are soaked in 160 g of water and dissolved at 40° C.

As a wetting agent, 0.75 g of the sodium salt of dodecylbenzene-sulfonic acid dissolved in 40 g of water are added. The mixture is cooled to 35° C., then a solution of 20 g of copolymer of 63% of methyl-methacrylate and 37% of methacrylic acid, 70 g of tert. butanol and 70 g of acetic ester is dispersed using a mixing apparatus at 1,500 r.p.m. into the gelatine solution.

Figure 5:

The solvent mixture is slowly evaporated over a period of 2 hours with slight stirring. After filtration through a straining cloth, particles having a particle size mixture of from 1 to 5 μm are obtained. The largest particles are from 10 to 15 μm in size. The particles have a grained porous surface and are opaque. FIG. 5 shows an electron microscopic magnification of these particles.

Dispersion (B) according to the present invention:

The aqueous-alcoholic suspension of the graft polymer 1 is distributed in a gelatine solution with a normal laboratory stirrer at a stirring speed of 60 r.p.m. In this way, a dispersion having the following composition is directly obtained without evaporating the solvent and without particular dispersion measures:

20 g of gelatine in 160 g of water 20 g of graft copolymer 1 in a mixture of 30 g of water and 10 g of ethanol. The mixture is suitable as a storage solution.

Figure 6:
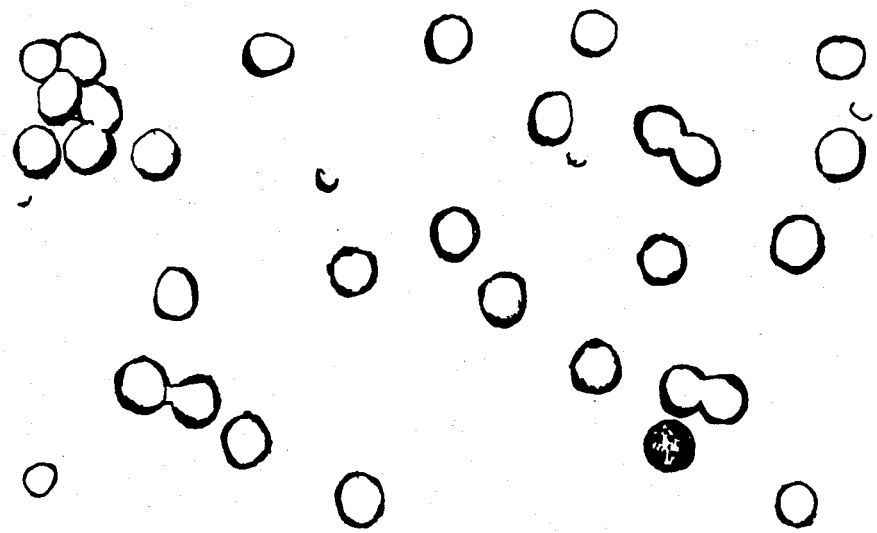

The advantage of the sample according to the present invention, as opposed to the comparative sample, is that the particle size and the distribution thereof is pre-set by the graft polymerisation and the suspension of the graft copolymers may be added to a casting solution, without there being an agglomeration of the particles. The particles according to the present invention are clear and have a smooth surface (see FIG. 6). In the comparative sample, the particle size is dependent on the quantity and type of the solvent, the quantity and type of the wetting agent, the temperature and the type of the dispersion. The mixture contains, moreover, combustible solvents which have to be carefully removed to prevent an aggregate forming.

The two particle samples are incorporated into the following covering layer composition:

400 g of water 70 g of 4% aqueous solution of the wetting agent $C_7F_{15}COO^\ominus(NH_4)^\oplus$, 40 g of one of the two above-mentioned dispersions (10% by weight of polymer)

500 g of a 10% aqueous hardening solution of a reaction product of taurine with the compound $C(CH_2-SO_2-CH=CH_2)_4$ (1:1 molar)

The casting compositions are applied to the layer side of a color negative film which has not been hardened. Sample A contains the comparative dispersion (A) Sample B contains the graft copolymer 1 according to the present invention as a dispersion (B) Sample C contains no polymers.

The test of samples A to C for the effectiveness of the polymers as spreader is carried out as in Example 1:

| Sample | Test 1 (Glossy points) in % | Test 2 (Cartridge removal) in g | Test 3 (Colour spots) in % | Test 4 (Graininess) δ-D-value |
|---|---|---|---|---|
| Sample A (comparison) | 5–10 | 250–300 | 0–3 | 2.0 |
| Sample B (present invention) | 0–5 | 200–250 | 0–3 | 1.8 |
| Sample C (without polymer) | 80–90 | 900–1200 | 20–40 | 1.8 |

It can be seen that after processing the photographic material with the particles has a high surface gloss. The particles according to the present invention with their smooth surface do not leave any disturbing traces on the surface of the covering layer.

The particles which are used as a comparison leave rifts on the surface which impair the gloss of the surface and give rise to an increased graininess.

We claim:

1. A photographic silver halide recording material which contains, in an outer transparent layer which is applied to the front and/or rear side, preformed polymer particles which have a particle size of less than 10 μm, are soluble in alkaline processing liquids and are dispersed in a hydrophilic colloid, characterised in that the layer contains in a dispersed form from 10 to 500 mg/m² of spherical particles of a graft copolymer of methacrylic acid and methyl-methacrylate on the graft base of an α-olefin- or styrene-maleic acid semi-amide- or maleic acid copolymer having a particle size of from 0.5 to 8 μm and a particle size distribution of ±1 μm.

2. A photographic silver halide recording material according to claim 1, characterised in that the polymer particles which are contained in the outer layer consist of from 80 to 99% of methacrylic acid and methyl-methacrylate and from 1 to 20% of an alternating copolymer of maleic acid semi-amide and an α-olefin or styrene as graft substrate having an acid number of from 200 to 300.

3. A photographic silver halide recording material according to claim 2, characterised in that the alternating copolymer is in the form of the alkali metal salt.

4. A photographic silver halide recording material according to claim 1, characterised in that the polymer particles are from 1.5 to 5 μm in size and the polymer has an acid number of from 210 to 270.

5. A photographic silver halide recording material according to claim 1, characterised in that the outer layer contains gelatine as hydrophilic colloid, and additionally silica, the particle size of which is less than 0.1 μm.

6. A photographic silver halide recording material according to claim 1, characterised in that the outer layer also contains a homo- or copolymer having a particle size of less than 0.1 μm and a glass transition temperature of more than 40° C.

* * * * *